Oct. 3, 1967    H. BREUER    3,344,661
DEVICE FOR TESTING THE TENSILE STRENGTH OF CHAINS OR THE LIKE
Filed May 1, 1964    2 Sheets-Sheet 1

INVENTOR
Heinz Breuer
By Tourover & Browdy
Attorneys

Oct. 3, 1967     H. BREUER     3,344,661
DEVICE FOR TESTING THE TENSILE STRENGTH OF CHAINS OR THE LIKE
Filed May 1, 1964     2 Sheets-Sheet 2
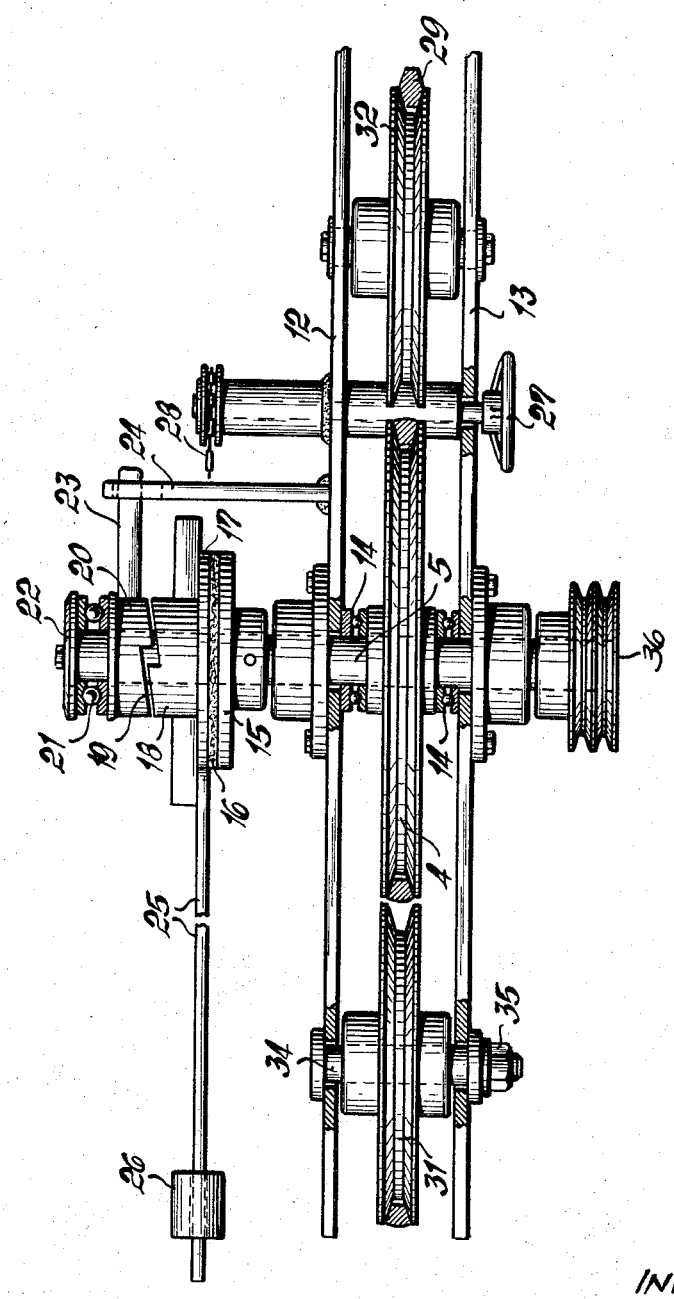
INVENTOR
Heinz Breuer
By Tourover & Browdy
Attorneys

United States Patent Office 3,344,661
Patented Oct. 3, 1967

3,344,661
DEVICE FOR TESTING THE TENSILE STRENGTH OF CHAINS OR THE LIKE
Heinz Breuer, Van der Giesestrasse 19, Duren, Rhineland, Germany
Filed May 1, 1964, Ser. No. 364,123
Claims priority, application Germany, May 2, 1963, R 35,072
3 Claims. (Cl. 73—95.5)

ABSTRACT OF THE DISCLOSURE

Apparatus for testing tensile strength of continuous strands including coplanar, peripherally grooved wheels about arrays of guide wheels supporting an endless flexible belt adjustably engaging on a strand being tested; in which one wheel is a draft wheel and the other is a retarding wheel for imposing a residual drag on the wheel through a disc brake and adjustable weight on a lever arm associated with the disc brake, and auxiliary drive means associated with the retarding wheel in the event of strand breakage to facilitate rethreading.

---

Figure 1:
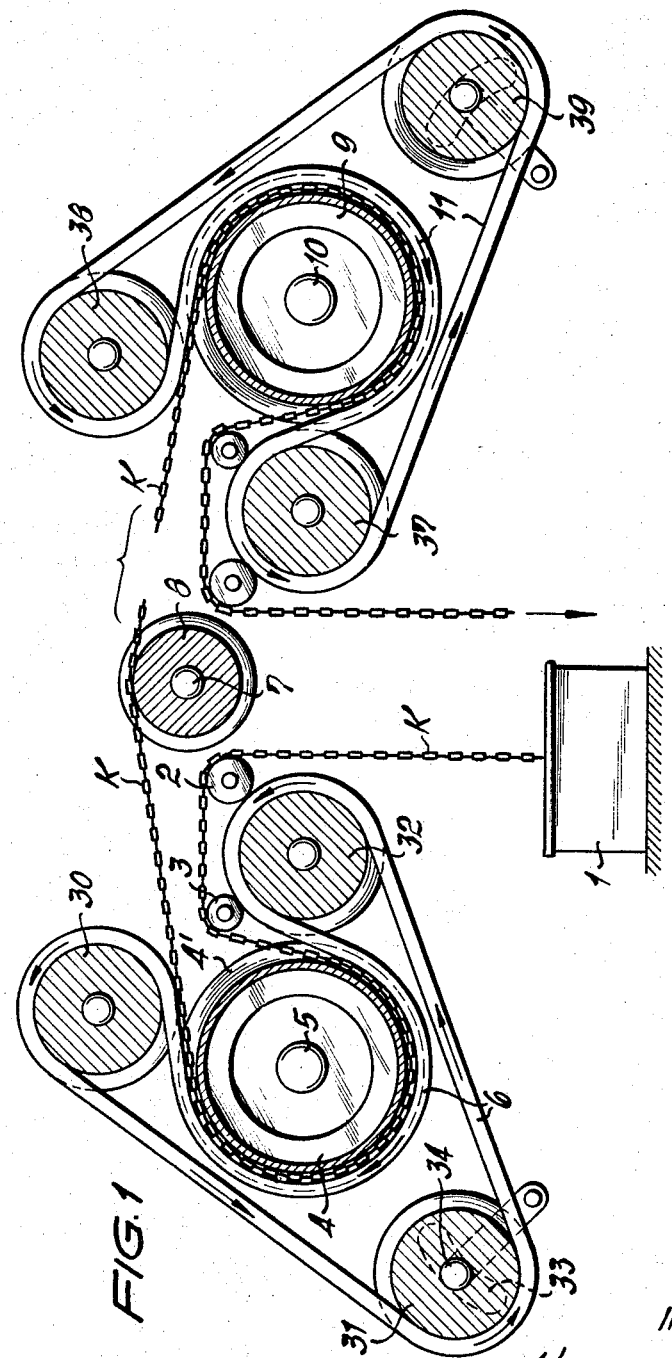

Up till now, product control and testing has been difficult in the manufacture of chains by machinery, more particularly chains of the kind whose links are bent pieces of wire closed by their abutting ends being welded together. Most modern chain-producing machinery is fully automatic and produces the chain in the form of continuous pieces or pieces of considerable length. The pieces can be tested in portions to make sure that the chain links have been welded satisfactorily—i.e., their tensile strength can be tested—for instance, by applying tension mechanically. Unfortunately, this is a complicated job, more particularly with small chains, and requires considerable manual labour, unlike what happens in the fully automatic production of chains.

It is an object of the invention to provide a chain testing machine for accurate and automatic tensile strength testing of chains of any length, more particularly of individual links thereof, and of other similar elements, such as ropes, cables, plastics cords and strings or the like. To this end, according to the invention two grooved wheels are mounted in the machine frame in spaced relation to one another and preferably with their axes parallel with one another, and a chain which it is required to test is retained by friction in the grooves of the grooved wheels through the agency of a flexible resilient draft element extending around some of the wheel periphery, one such draft element being provided for each system of grooved wheels, that of the grooved wheels which receives the chain being connected to an adjustable brake while the other of the grooved wheels from which the tested chain departs is connected to a driving motor, a dynamometer being provided between the two grooved wheels for measuring the tension continuously applied to the unsupported piece of chain between the two grooved wheels.

The chain being tested passes first over the grooved wheel connected to the brake, then over the dynamometer or an associated guide roller, and finally over the driven grooved wheel. A desired tension corresponding to the required tensile strength of the chain can be applied to the piece of chain which happens to be between the two grooved wheels by appropriate adjustment of the brake associated with one of the grooved wheels; consequently, all the links of a piece of chain, however long it may be, briefly experience the tension indicated by the dynamometer. If the piece of chain contains links which are welded inadequately or not at all or have other defects, the chain breaks, and the dynamometer trips and gives a warning. The machine operator can then pick up the two ends of the chain at the break, replace the faulty link and weld it together while still on the apparatus, whereafter the replacement link is similarly given the tensile test.

Advantageously, the brake associated with one of the grooved wheels is embodied after the fashion of a friction plate clutch, the two friction plates being pressed against one another by helical surfaces embodied as axial cams. The pressure with which the friction plates engage with one another can be controlled automatically by a loading weight adjustably mounted on a lever arm fitted to that friction plate which is stationary or which has only limited provision for rotation.

Advantageously, V belts or double-V belts made of rubber or the like are used as the endless draft members for pressing the chain under test against the grooved wheels.

A chain-testing device according to the invention is shown in the drawings wherein:

FIG. 1 is a diagrammatic side elevation of the testing device according to the invention, and FIG. 2 is a plan view showing the arrangement of the wheels in the device at the chain entry end with portions broken away and shown in section for clarity.

As can be seen in FIG. 1, a chain K for testing is taken, for instance, from a storage bin or the like 1 and passes over guide rollers 2, 3 to enter a groove 4' in a wheel 4 rotatable around a spindle 5. An endless element in the form of a V belt or double-V belt 6 engages around the wheel 4 and presses the chain K against the base of the groove 4' to produce a frictional engagement between the chain K, on the one hand, and the member 6 and wheel 4, on the other hand. The wheel 4 is connected to a braking device which will be described hereinafter.

After leaving the groove 4' the chain K runs over a roller 8 rotatable around a spindle 7, then passes to a grooved wheel 9 which is rotatable around a spindle 10, and is associated with an endless member 11 which produces a frictional engagement between the chain K, the wheel 9 and the member 11 in that peripheral part of the wheel 9 around which the member 11 extends. The wheel 9 is connected to a driving motor (not shown) and runs at a substantially constant speed.

The spindle 7 of the roller 8 is movable and connected to a conventional dynamometer (not shown) which indicates and, if desired, also records thrusts acting perpendicularly to the spindle 7.

As FIGS. 1 and 2 show, the roller 8 is disposed, in relation to the wheels 4, 9, laterally of the tangent to the periphery of both such wheels; consequently, the chain K running over the roller 8 experiences bending near the same. Consequently, if the spindles 5, 10 of the wheels 4, 9 are disposed in the same plane—preferably the horizontal plane—and the spindle 7 of the roller 8 is disposed in the central plane between the spindles 5 and 10, the chain K applies to the roller 8 a thrust proportional to the tension of the chain between the wheels 4 and 9. This tension is in turn governed by the retardation of the wheel 4.

In other words, by means of the brake associated with the wheel 4, the portion of chain between the wheel 4 and the wheel 9 can have applied to it a tension which the dynamometer connected to the roller 8 indicates as a pressure and which—assuming that the piece of chain under test passes through the machine in non-varying conditions—acts consecutively on all the links of the chain, however long the same may be. As FIG. 3 shows for the case of the wheel 4, the two grooved wheels 4, 9 are rotatably mounted, for instance, between two frame plates 12, 13 of the machine, the plates 12, 13 being rigidly interconnected by struts or spacer bolts (not shown). The spindle 5 of the wheel 4 is associated with thrust bearings 14 which transmit axial loads to the frame walls 12, 13. Mounted on one end of the spindle 5 is a friction plate 15 having some appropriate form of friction lining 16. Opposite the friction plate 15, a matching plate 17 is disposed, for free rotation, on the stub shaft 5 and has an extension 18 which serves as a rotating wedge and which comprises a helical surface 19. Disposed on the stub shaft or spindle 5 opposite the extension 18 is a mating abutment 20 connected, with the interposition of a ball thrust bearing 21, to a disc or plate 22 so connected to the shaft 5 as to rotate solidly therewith. The abutment 20 has an arm 23 which is so retained, by a lateral arm 24 of the plate 12, as to be movable parallel with the axis of the shaft 5 and as to be non-rotatable. The stationary friction plate 18 has a lever arm 25 comprising an adjustable weighting member 26. The same can be moved along the lever arm through the agency of a system comprising a hand-wheel 27 mounted in the frame, and a cord or the like 28.

As FIG. 2 shows, in this particular arrangement the plate 17 applies to the plate 15 a pressure which is governed by the position of the weighting member 26 on the lever arm 25; varying the relative axial position to one another of the plates 17 and 15 automatically equalises the pressure by a corresponding relative rotation of the plate 18 to the peripherally stationary bearing 20.

The endless member—e.g., a double-V belt, as 29—running over the grooved wheel 4 passes therefrom to an axially stationary grooved wheel 30, then runs over an adjustable grooved wheel 31 which acts as a tensioning element, then returns via an axially stationary grooved wheel 32 to the wheel 4. The pressure applied by the element 29 to the wheel 4 can be varied as required by variation of the axial position of the wheel 31. The chain K can therefore be secured by friction in the groove in the wheel 4 by means of the element 6 so that the chain runs at a speed equal to the peripheral speed of the wheel 4. To enable the wheel 31 to be adjusted, the plate 13 is formed with a slot 33 through which spindle 34 of the wheel 31 extends. By means of a screw 35 visible in FIG. 3, the wheel 31 can be located in any desired position in the slot 33.

At the bottom free end of the shaft 5 is a double-grooved wheel 36 which is connected by belting to an auxiliary motor (not shown), advantageously permanently. The function of this auxiliary drive is to move the wheel 4 and associated elements 6 if, for instance, the chain under test has broken and a piece of the chain has to be pulled out to repair the break. If the auxiliary drive is associated with the wheel 36, the adjustment of the weighting member 26 and of the friction discs 15, 17 need not be disturbed.

As the arangement shown in FIG. 3 shows, the grooved wheel 9 on the output side of the machine has associated with it axially stationary grooved wheels 37, 38 and one adjustable grooved wheel 39, over all of which the endless draft element 6' runs.

According to another important feature of the invention, that part of the machine comprising the braked wheel 4, the elements operatively associated therewith and the chain storage bin or the like 1 are so arranged in the frame as to be electrically insulated therefrom. The two wheel systems can then form part of an electric circuit which is closed by the particular piece of chain present between the two wheels 4 and 9. If the chain breaks, the circuit is interrupted and a warning given.

I claim:
1. Device for continuously testing the tensile strength of chains or the like comprising
   a first peripherally grooved wheel mounted on a first axis for continuous rotation and adapted to continuously receive about the majority of its periphery the strand for testing,
   supply means for freely passing the strand to be tested to said first grooved wheel,
   brake means for said first-grooved wheel to inhibit the rotation thereof,
   a second peripherally grooved wheel mounted for rotation on a second axis parallel to said first axis, said second grooved wheel being adapted to continuously receive about the majority of its periphery the strand for testing downstream from said first grooved wheel,
   driving motor means for said second grooved wheel to effect continuous rotation thereof at a given rate and under a given force, to provide the length of strand between said first and second wheels with a given tension,
   separate means for firmly retaining the strand to be tested within the peripheral groove of each of said wheels to inhibit sliding of the strand therein, each said means comprising a supple and flexibly yielding endless belt overlying the strand about said majority of the periphery of each said wheel,
   means to measure the tension of the length of unsupported strand between said first and second wheels, said measuring means comprising a rotatable spindle contacting said unsupported strand between said wheels, said first wheel including auxiliary drive means operatively connected thereto for advancing the strand being tested to said second wheel for re-threading the device in the event the continuous strand being tested is broken.
2. The structure as claimed in claim 1 in which said separate means for firmly retaining the strand comprises guide wheels disposed in a triangular array about said grooved wheels, said endless belt being entrained over said guide wheels and around a major portion of the circumferential portion of said grooved wheels.
3. The structure as claimed in claim 1 said brake means comprising an axially projecting shaft upon which said first-grooved wheel is secured, a friction disc secured to and rotatable with said shaft, a braking plate journaled on said shaft and axially engageable with said friction disc, cooperating cam means on said disc and plate for causing engagement therebetween, said braking plate including a radially projecting lever arm, and weight means adjustably mounted on said lever arm for presetting the frictional engagement between said disc and plate to impose a residual drag on said shaft.

References Cited

UNITED STATES PATENTS

| 1,168,870 | 1/1916 | Faulkner | 73—95.5 |
| 2,111,801 | 3/1938 | Olson | 73—135 |
| 2,693,108 | 11/1954 | Olson | 73—95.5 |

FOREIGN PATENTS

| 1,043,434 | 6/1953 | France. |
| 206,850 | 2/1909 | Germany. |
| 725,731 | 3/1955 | Great Britain. |
| 203,703 | 10/1924 | Great Britain. |

RICHARD D. QUEISSER, *Primary Examiner.*

J. J. GILL, *Examiner.*

J. H. WILLIAMSON, *Assistant Examiner.*